United States Patent [19]

Frisch et al.

[11] Patent Number: 5,343,894
[45] Date of Patent: Sep. 6, 1994

[54] PIEZO VALVE

[75] Inventors: Herbert Frisch, Vienna, Austria; Johannes Wirtl, Schongau, Fed. Rep. of Germany

[73] Assignee: Hoerbiger Ventilwerke Aktiengesellschaft, Vienna, Austria

[21] Appl. No.: 953,115

[22] Filed: Sep. 29, 1992

[30] Foreign Application Priority Data

Sep. 30, 1991 [AT] Austria ................... 1962/91

[51] Int. Cl.$^5$ ................................... F15B 13/044
[52] U.S. Cl. ........................ 137/625.65; 137/625.44; 251/129.06
[58] Field of Search ........... 137/625.44, 625.65; 251/129.02, 129.06

[56] References Cited

U.S. PATENT DOCUMENTS

| 4,535,810 | 8/1985 | Duder et al. ............... 137/625.65 X |
| 4,617,952 | 10/1986 | Fujiwara et al. ........... 251/129.06 X |
| 5,163,463 | 11/1992 | Gassman et al. ........... 251/129.06 X |

FOREIGN PATENT DOCUMENTS

| 0046431 | 2/1982 | European Pat. Off. . |
| 0191011 | 8/1986 | European Pat. Off. . |
| 2511752 | 10/1976 | Fed. Rep. of Germany . |
| 3400645 | 7/1984 | Fed. Rep. of Germany . |
| 63-83473 | 4/1988 | Japan ................. 251/129.06 |
| 63-106475 | 5/1988 | Japan ................. 251/129.06 |
| 63-145884 | 6/1988 | Japan ................. 251/129.06 |
| 63-152783 | 6/1988 | Japan ................. 251/129.06 |
| 2134223 | 8/1984 | United Kingdom ...... 251/129.06 |

OTHER PUBLICATIONS

G 86 07 0940, dated Nov. 2, 1989, German Gebrauchsmuster.

Primary Examiner—Gerald A. Michalsky
Attorney, Agent, or Firm—Watson, Cole, Grindle & Watson

[57] ABSTRACT

For a piezo valve (1) the sealable surface of the seat (13) of the controllable medium connection is so large that the pressure-induced closing force of the sealing region (14) of the bending element (4) that is generated in accordance with the medium pressure acting in the second switch position is greater than the elastically induced counterforce and smaller than the total of this counterforce and the piezo reset force acting upon application of a corresponding control voltage. Thus, both switch positions of the valve can also be held for a long period of time following pulsed voltage operation without any additional voltage application.

2 Claims, 1 Drawing Sheet

PIEZO VALVE

BACKGROUND OF THE INVENTION

This invention relates to a piezo valve with a housing which has at least one controllable medium connection and in which is arranged a piezoelectric bending element that has a sealing region and which can be moved against an elastically raised counterforce in accordance with an applied control voltage and which in a first switch position without control voltage is lifted from the seat of the controllable medium connection and in a second switch position subject to the control voltage and supported by the pressure of the medium to be blocked rests sealingly on this seat.

Such arrangements are known, for example, from the DE-A1 34 00 645, EP-A1 191 011, EP-A1 46 431, DE-A1 25 11 752 and DE-U1 86 07 094.0. In all cases a piezoelectric bending element can be moved in a valve housing between a feed and discharge seat, whereby the medium outflow can be connected either to the feed side or to the discharge side. In so doing, it is necessary to hold the bending element alive in the switch position blocking the discharge seat, a feature that has the drawback that at raised operating temperatures the piezoelectric bending element is deformed permanently by the prolonged electric voltage application, a problem that can be explained by the corresponding properties of the piezo materials used. Therefore, one must always strive to hold the switch positions, where the bending position is alive, relatively short, at least at raised operating temperatures that deviate from room temperature, a procedure that limits the application range of such valve or signal converters and thus constitutes a drawback, since in all cases it must be ensured that the bending element has not deformed itself permanently so much in the voltage application time that upon removing the voltage there is no more switch back.

The object of the present invention is to avoid the aforementioned drawbacks of the known arrangements of the aforementioned kind and to design in particular such a valve that both switch positions can be maintained for an abitrary length of time even at raised operating temperatures, without the risk of the bending element being permanently deformed and thus hindered in its function.

SUMMARY OF THE INVENTION

The above problem with a piezo valve of the aforementioned kind is solved according to the invention in that the sealable surface of the seat of the controllable medium connection is so large that the pressure-induced closing force of the sealing region of the bending element that is generated by the medium pressure acting in the second switch position is greater than the elastically induced counterforce and smaller than the total of this counterforce and the piezo reset force acting upon application of a corresponding control voltage. Thus, the seal of the controllable medium connection during the active pressure of the medium to be blocked is achieved by its effect on the moveable sealing region of the bending element. During active pressure and due to the closed medium-connection sealing the piezoelectric bending element after a short period of voltage application, the voltage application of the piezoelectric bending element can be reset to zero, or this voltage application can be at least greatly reduced, even if possibly for safety reasons there is a need to maintain a specified defined voltage application of the bending element. The omission or at least the drastic reduction of the required application required to hold the sealing region of the piezoelectric bending element in the second switch position can reduce at least largely the described risk of the piezoelectric bending element being permanently deformed even at raised operating temperatures.

To switch the piezoelectric bending element back into the first switch position that releases again the seat of the controllable medium connection, all that is required is the short-term application of a suitable voltage pulse, whose polarity is reversed in the normal case, to the piezoelectric bending element. Thus, in both switch positions the application of voltage to the piezoelectric bending element in the normal case is necessary only to switch over into the respective other switch position, whereby not only the feed, insulation and the like of the bending element is simplified but also the addressed problems with the permanent deformation of the bending element at raised operating temperatures are reliably avoided.

According to an especially preferred embodiment of the invention, for a valve designed as a 3/2 way valve where a medium outlet is provided in the housing, the sealing region of the bending element in the first switch position is prestressed flexibly sealingly against a feed seat disposed in the housing and in the second switch position raised from the feed seat and rests sealingly against a discharge seat disposed in the housing substantially opposite the feed seat; and it is provided that the surface of the discharge seat that can be sealed by the sealing region of the bending element is larger than the corresponding surface of the feed seat. Thus, while maintaining the aforementioned conditions for a bistable switching property of the piezo valve, it can be ensured that the feed seat remains closed subject to the effect of the elastic prestress of the sealing region of the bending element until through application of a voltage pulse the bending element is raised from the feed seat while overcoming the elastic prestress and rests sealingly against the substantially opposite discharge seat. After this sealing abutment at the discharge seat, the control voltage of the piezoelectric bending element can be removed again, which then remains closed merely while exploiting the pressure exerted by the medium to be blocked on the sealing region of the bending element.

To switch back into the switch blocking the feed seat, only a correspondingly reversed voltage pulse is required in turn, since after the sealing region of the bending element has been lifted from the discharge seat, the pressure support drops away and the prestress of the bending element moves the moveable sealing region again in the direction of the feed seat to be blocked.

The invention will now be further explained with reference to the embodiment shown in the attached drawings.

DETAILED DESCRIPTION OF THE PREFERRED EMBODIMENT

Figure 1:
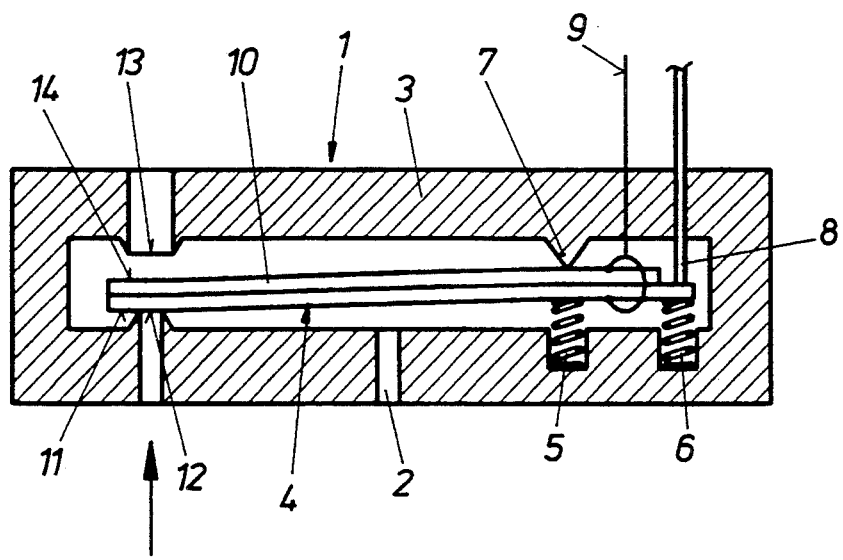
FIG. 1 is an enlarged view of a piezo valve according to the invention in an electropneumatic signal converter.

The illustrated electropneumatic signal converter 1 comprises substantially a housing 3 having a medium or signal output 2 and in which a piezoelectric bending element 4 is disposed. The bending element 4 is firmly clamped on the right side in the drawing by means of springs 5, 6, against a knife-like support 7 on the one hand, or a connection contact 8 on the other hand, thus virtually fixing the corresponding end of the substantially strip-shaped bending element 4 relative to the housing 3.

The opposing, electrically-conducting layered surfaces of both layers 10, 11 of the bending element 4, which is assembled like a sandwich, are connected by way of the connection contact 8 and the connecting lead 9 to a voltage selection (not illustrated here) by way of which a voltage of suitable size, duration, pulse shape, polarity, etc., that serves to mechanicially deflect the bending element 4 can be applied.

In the electrically dead position of the bending element 4 or the connections 8, 9 that are shown in FIG. 1, the bending element 4 or its left end in the drawing is prestressed sealingly with a moveable sealing region 14 against a feed seat 12 disposed in the housing 3, whereby the signal output 2 remains connected to the discharge seat 13. Upon applying a suitable electric voltage by way of the connection contact 8 or the connecting lead 9 to the bending element 4, the element pivots back into the position shown in FIG. 2 in accordance with the reversed piezoelectric effect, whereby the sealing region 14 of bending element 4 or its left end rises from the feed seat 12 and rests sealing against the discharge seat 13.

Figure 2:
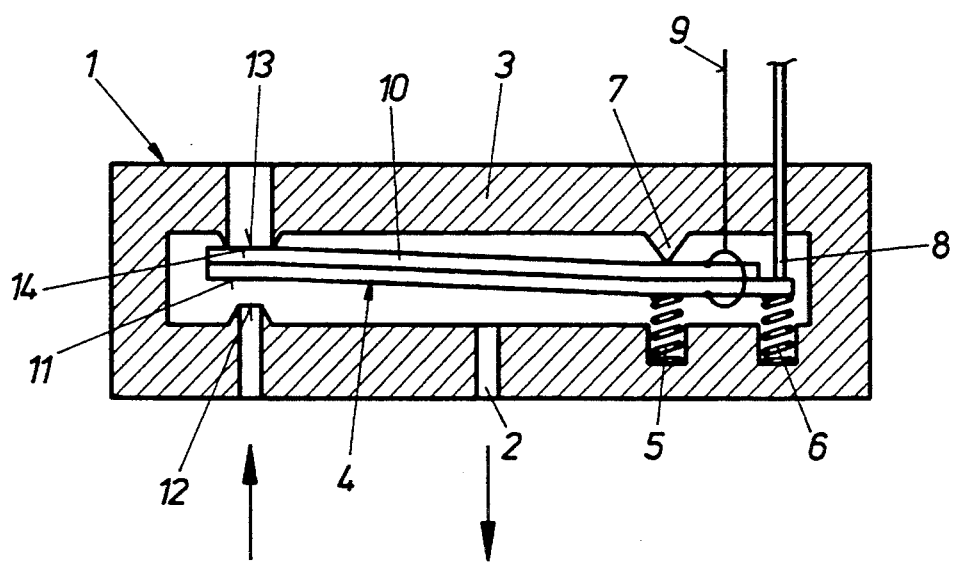
FIG. 2 shows the signal converter according to FIG. 1 in its other switch condition.

To achieve that the two switch positions according to FIG. 1 or FIG. 2 can be maintained an arbitrary length of time even at raised operating temperature during the operation of the signal converter without the risk of the bending element 4 deforming permanently on account of the piezoelectric properties of the layers 10, 11 and thus hindering the function of the arrangement 1, the discharge seat 13 is designed, on the one hand, with a larger flow opening than the feed seat 12. On the other hand, the sealable surface of the discharge seat 13 is so large that the pressure-induced closing force of the sealing region 14 of the bending element 4 that is generated in accordance with the feed pressure acting in the second switch position is greater than the elastically induced counterforce of the bending element 4 and smaller than the total of this counterforce and the piezo reset force acting upon application of a suitable control voltage.

This results in the advantage that, to hold the switch position shown in FIG. 2 at the acting feed pressure, it is no longer necessary to apply a voltage to the bending element 4, which remains pressed against the discharge seat 13 merely by way of the effect of the feed pressure. Not until a suitable reversed voltage application of the bending element 4 does the element flip back again into the position shown in FIG. 1, where it stays even without any applied voltage on account of the mechanical prestress of the bending element 4.

Apart from this disclosed embodiment, modifications with respect to the design, clamping, and contact of the bending element and also with respect to the design of the housing and the feed lines to the feed seat or discharge seat are also possible within the scope of the invention without any more ado. What is important is only that one of the switch positions be held electrically dead through a suitable design and arrangement or mechanical prestress or preloading of the bending element 4, while the other switch position can be held with the support or subject merely to the effect of the medium or feed pressure to be blocked, while the voltage at the bending element is significantly reduced or dispensed with. In so doing, it is immaterial which kind of valve or converter or the like it is—in addition to the 3/2 way valve shown and discussed, any other suitable valve form or design can naturally also be controlled piezoelectrically in this manner. Thus, for a two way valve designed according to the invention the feed can be constantly open and the discharge can be controlled with a piezoelectric bending element in accordance with the aforemention design. It is lifted from the discharge seat in its electrically dead quiescent position, yet the feed seat remains opened. Upon application of the control voltage to the piezoelectric bending element, the described sealing of the discharge seat occurs again.

We claim:

1. A piezo valve which comprises:
   a housing that defines a chamber, a medium output channel which communicates with said chamber, a medium input channel which communicates with said chamber, and a medium discharge channel which communicates with said chamber, said medium discharge channel being located generally opposite said medium input channel and having a larger cross section than the cross section of the medium input channel,
   a piezo bending element located within said chamber and defining a sealing end which can alternatively block said medium discharge channel and said medium input channel,
   an electrical lead connected to said piezo bending element for supplying one of a first and a second control voltage to said piezo bending element, and
   means for mounting said piezo bending element in said chamber so as to be biased into a first switch position wherein said sealing end thereof blocks said medium input channel but allows bending of said piezo bending element into a second switch position wherein said sealing end blocks said medium discharge channel, said piezo bending element bending into said second switch position when said first control voltage is supplied thereto and is retained in said second switch position by fluid passing into said chamber through said medium input channel, and said piezo bending element bending into said first switch position when said second control voltage is supplied thereto and is retained in said second switch position without an electrical voltage supplied thereto.

2. A piezo valve as claimed in claim 1, wherein said piezo being element defines a support end opposite said sealing end, wherein said housing defines a knife support protrusion which extends into said chamber to contact a first surface of said piezo bending element at said support end, wherein a first spring extends from said housing to contact a second surface of said piezo bending element in alignment with said knife support protrusion so as to press said piezo bending element against said knife support protrusion, and wherein a second spring contacts said second surface of said piezo bending element to bias said piezo bending element about said knife support protrusion and bias said piezo bending element into said first switch position.

* * * * *